United States Patent [19]

Langevin

[11] 4,311,163
[45] Jan. 19, 1982

[54] DISASSEMBLABLE DEVICE FOR FITTING A DEVICE BETWEEN THE OPPOSITE ENDS OF TWO PIPES

[75] Inventor: Bernard Langevin, Equeurdreville, France

[73] Assignee: Commissariat a l'Energie Atomique, Equeurdreville, France

[21] Appl. No.: 115,496

[22] Filed: Jan. 25, 1980

[30] Foreign Application Priority Data

Feb. 2, 1979 [FR] France .............................. 79 02754

[51] Int. Cl.$^3$ ............................................. F16K 43/00
[52] U.S. Cl. ..................................... 137/315; 251/152
[58] Field of Search ............... 137/315; 251/203, 326, 251/327, 328, 194, 195, 197, 199, 158, 159, 148, 152

[56] References Cited

U.S. PATENT DOCUMENTS

| | | | |
|---|---|---|---|
| 1,186,627 | 6/1916 | Wade | 251/203 |
| 1,692,496 | 11/1928 | Fröb | 251/194 |
| 2,148,628 | 2/1939 | Laurent | 251/194 |
| 2,636,713 | 4/1953 | Harner | 137/315 |
| 2,834,571 | 5/1958 | Hollander | 251/203 |
| 2,931,394 | 4/1960 | Harner | 251/328 |
| 3,068,901 | 12/1962 | Anderson | 251/327 |
| 3,111,137 | 11/1963 | Carlin | 137/315 |
| 3,179,372 | 4/1965 | Vaudreuil | 251/328 |
| 3,889,925 | 6/1975 | Brooks | 251/328 |
| 4,079,746 | 3/1978 | Killian | 137/315 |

*Primary Examiner*—Martin P. Schwadron
*Assistant Examiner*—G. L. Walton
*Attorney, Agent, or Firm*—Pearne, Gordon, Sessions, McCoy & Granger

[57] ABSTRACT

Disassemblable device provided for inserting a device between the opposite ends of two pipes comprising two flanges which can be sealingly fixed to the said ends, wherein it also comprises an extensible member constituting a unitary assembly, which can be mounted in retracted manner between the flanges and then extended so as to sealingly bear against the latter, said extensible member being traversed by a passage which is substantially aligned with the axis of the pipes, when it sealingly bears against the flanges.

10 Claims, 3 Drawing Figures

DISASSEMBLABLE DEVICE FOR FITTING A DEVICE BETWEEN THE OPPOSITE ENDS OF TWO PIPES

BACKGROUND OF THE INVENTION

The invention relates to a disassemblable device for permitting the fitting of a device such as a valve between the opposite ends of two pipes.

It is known to use flanges, which are generally fixed by welding to each of the ends of the pipes for fitting a device such as a valve between two pipes.

The valve is then fitted by means of cords, i.e. ties which pass through aligned fixing holes formed in the flanges by moving together the flanges and the pipes. In view of the fact that before tightening the cords there can be a greater or lesser spacing between the flanges, the stress produced in the pipes and in their supports varies with said spacing and can reach very high levels when it exceeds a certain threshold. Moreover, when there is difficult access to the pipes, for example when they are disposed inside an enclosure or behind a wall the access opening made in this wall or in this enclosure can be displaced relative to the connecting device. This leads to difficulties in connection with the assembly and disassembly of the device and of the valve with which it is associated and these are made worse by the problems of access for valve control purposes. These difficulties become insurmountable when it is a question of a remote changing of a valve.

Another known dismantleable device has screwed couplings constituted by a nut or by a threaded end fitting mounted so as to rotate on the end of each of the pipes, said couplings being such that they are screwed to corresponding threaded end fittings formed on a device, such as a valve to be fitted between the opposite ends of the pipes. This device has disadvantages comparable to the device using cords. Thus, it also has the effect of moving the ends of the pipe towards one another. Moreover, this device is virtually unusable when the pipes are virtually inaccessible.

The two known devices described hereinbefore cannot be positioned in the immediate vicinity of a rigid wall, such as a concrete wall due to the space which must be provided in order to permit the assembly and disassembly of the device by means of a tool. Finally, the parallelism of the joining planes defined by the flanges must be obtained at the end of tightening, no matter what the shapes of the pipes and the complexity of the system formed by them.

BRIEF SUMMARY OF THE INVENTION

The present invention relates to a disassembable device provided for inserting a device such as a valve between the opposite ends of two pipes, which makes it possible to obviate the disadvantages of the above-mentioned, known devices, whose design is relatively simple and whose assembly and disassembly can be easily carried out, even remotely in the case where the pipes are not directly accessible.

The present invention therefore relates to a disassemblable device provided for inserting a device between the opposite ends of two pipes, comprising two flanges which can be sealingly fixed to the said ends, wherein it also comprises an extensible member constituting a unitary subassembly, which can be mounted in retracted manner between the flanges and then extended so as to sealingly bear against the latter, said extensible member being traversed by a passage which is substantially aligned with the axis of the pipes, when it sealingly bears against the flanges.

According to an embodiment of the invention, the extensible member has two tubular portions, whereof one carries the said device, such as a valve, a wedge moving in a traverse direction with respect to the axis of the pipes under the action of control means and cooperating with a ramp made on at least one of the said tubular portions and a connecting member supporting the wedge by means of control means and supporting the tubular portions by means of supporting means permitting a displacement of the said portions parallel to the axis of the pipes.

According to a variant of this embodiment, the displacement of the wedge is controlled by a threaded bolt, whereof one end is associated in translation with the wedge, the threaded bolt being screwed into the connecting member. Preferably, the other end of the threaded bolt has an operating head to which is fitted a control member traversing an opening formed in a wall by at least two plugs, the first of said plugs being received in rotary manner in the said opening, whilst the second plug is received in rotary manner in an eccentric hole formed in the first plug and the control member is received in rotary manner in an eccentric hole formed in the second plug. This makes it possible to remotely control the assembly and disassembly of the connecting device by means of a rigid control. Thus, the two plugs which are fitted into one another are provided with eccentric holes making it possible to compensate a possible displacement between the axis of the opening formed in the wall and the axis of the threaded bolt permitting the manipulation of the wedge. The opening can then be formed in a third plug onto which is fixed the connecting member, the dimensions of the opening permitting the passage of the extensible tubular member. These characteristics make it possible to fit the device according to the invention in the immediate vicinity of a rigid wall, such as a concrete wall or into a sealed and insulated enclosure.

When the operation of the device is controlled by a control member traversing an opening formed in a wall by means of two plugs fitted into one another and having in each case an eccentric hole, the apparatus can be constituted by a valve having an operating head onto which is fitted the operating member after rotation of the first and second plugs.

According to a secondary feature of the invention annular gaskets are arranged at the ends of the tubular members able to cooperate with the flanges and between the wedge and the tubular members.

According to another feature of the invention, the apparatus is sealingly mounted between two elements constituting the corresponding tubular member by means of spacers connecting the said elements.

According to another secondary feature of the invention, spacers connect the flanges in a rigid manner making it possible to obtain a correct parallelism between the two faces of the facing flanges, as well as a good alignment of the two pipes, together with a control of the distance separating the spacers.

According to another secondary feature of the invention, guidance means constituted for example by other spacers, are disposed between the flanges for defining with the latter a cradle receiving the extensible tubular member, as well as the valve associated with said member. This makes it possible to ensure a correct positioning and in particular a correct centering of the extensible tubular member, even when access difficulties to the pipes make a blind fitting of the device necessary, i.e. when no visual control of the positioning is possible.

BRIEF DESCRIPTION OF THE DRAWINGS

The invention is described hereinafter with reference to non-limitative embodiments and the attached drawings, wherein show.

DETAILED DESCRIPTION OF THE PREFERRED EMBODIMENTS

Figure 1:
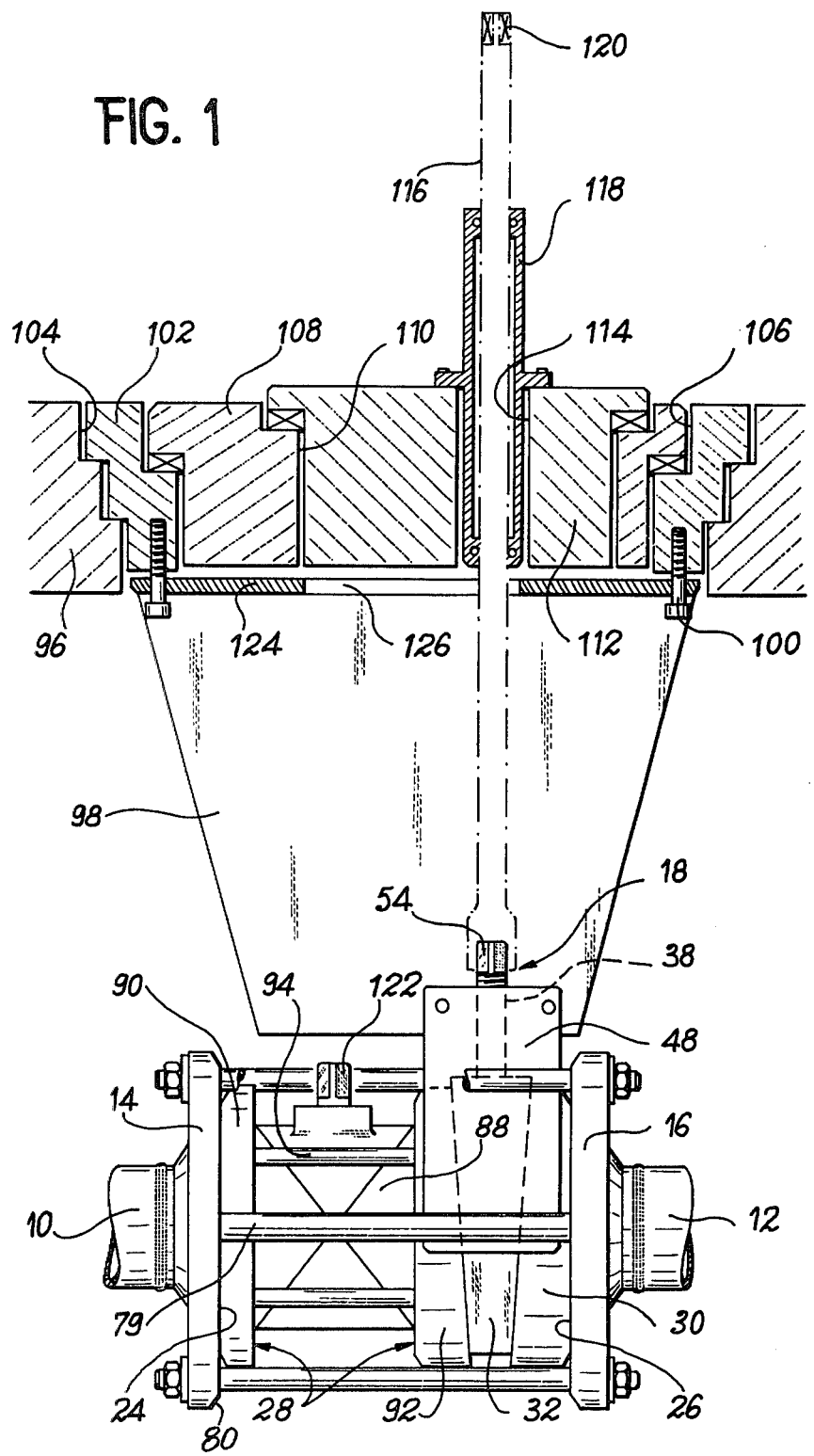
FIG. 1 a side view in partial cross-section of a disassemblable device ensuring the fitting of a valve between the facing ends of two pipes, said device incorporating a remote control system traversing an opening made in a wall behind which is located the pipes.

The disassemblable device shown in the drawings is positioned between the axially aligned ends 10, 12 of two pipes having the same diameter, within which circulates a random fluid.

The device according to the invention essentially comprises two flanges 14, 16 and tightening or gripping means incorporating an extensible tubular member designated by the reference numeral 18 and bearing on flanges 14, 16 for sealingly connecting the latter. Flanges 14 and 16 are identical and are respectively fixed to ends 10 and 12 of the pipe by any appropriate means, such as welds 20, 22. Flanges 14, 16 define opposite surfaces 24, 26, between which is disposed the extensible tubular member 18.

Figure 2:
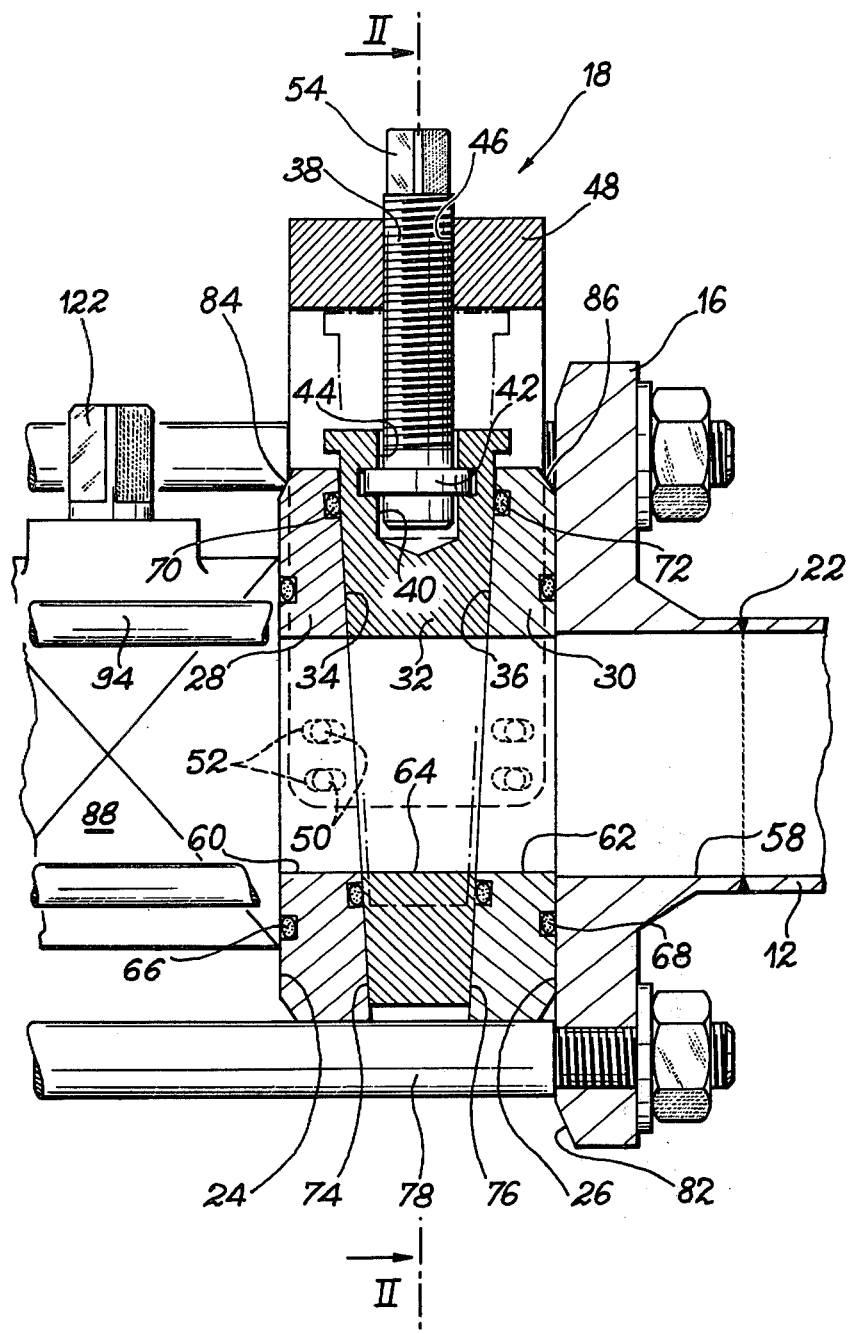
FIG. 2 a longitudinal sectional view of part of the disassemblable device shown in FIG. 1.

As illustrated in FIG. 2, the extensible tubular member 18 comprises two tubular portions 28, 30 and spacing means constituted in the present embodiment by a wedge 32. Wedge 32 is positioned between the tubular parts 28, 30 and can move transversely with respect to the axis defined by ends 10, 12 of the pipes in such a way as to act on the tubular parts 28, 30, by moving them apart from one another as a result of the cooperation of wedge 32 with inclined ramps 34, 36, respectively formed on each of the said parts. The transverse displacement of wedge 32 is controlled by a threaded bolt 38, whereof one of the ends has a collar 42 received in rotary manner in a groove 44, defined in a blind hole 40 formed in wedge 32. The threaded bolt 38 is screwed into a tapped hole 46 formed in a yoke-like supporting member 48, which extends on either side of the wedge 32 and tubular members 28, 30. Supporting member 48 ensures the guidance of wedge 32 when the latter moves vertically (FIGS. 2 and 3) by means of two holes 49 in which are slidingly received two bolts 51. The threads formed on bolts 51, as well as the threads with which they cooperate in wedge 32 are preferably sufficiently long to permit the raising of the wedge in the case of damage to screw 38. The horizontal guidance of tubular members 28, 30 (FIG. 2) is brought about by means of pins 50 received in long oblong openings 52 formed in the supporting member 48. The end of threaded bolt 38, opposite to that carrying the collar 42 projects outwards with respect to the supporting member 48 and has an operating head 54 in order to receive an appropriate, not shown operating tool.

In order to permit the passage of fluid between the ends 10, 12 of the pipes the flanges 14, 16, as well as the tubular members 28, 30 have substantially aligned passages of the same diameter (only three passages shown designated by the reference numerals 58, 60, 62 respectively). In the same way, wedge 32 is traversed by a passage 64, whose diameter is the same or greater than that of the earlier-noted four passages including passages 58, 60, 62, passage 64 being aligned with the latter when the tubular members 28 and 30 sealingly engage the facing surfaces 24, 26 formed on flanges 14, 16.

Figure 3:
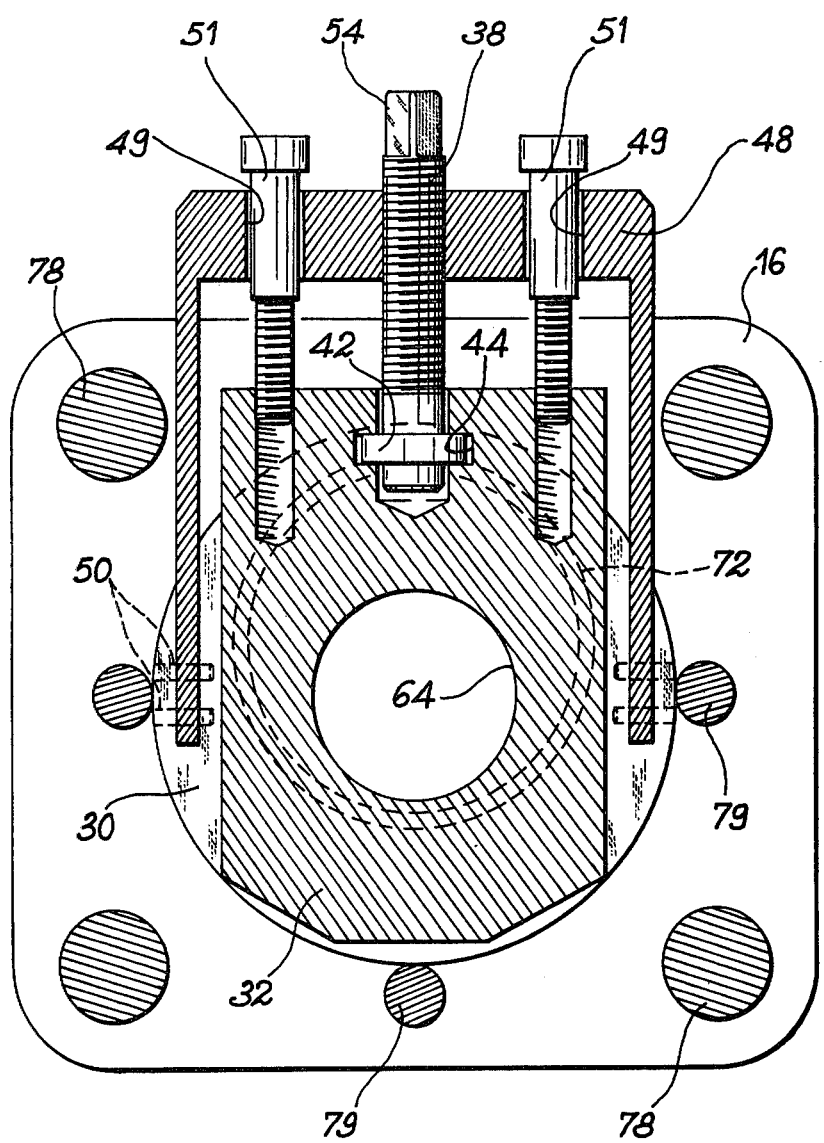
FIG. 3 a sectional view of the device along line 3—3 of FIG. 2.

Moreover, the sealing of the device, particularly at the interfaces between the flanges and the tubular members and between the latter and wedge 32, is obtained by means of O-rings 66, 68 positioned in annular grooves made in tubular members 28, 30 around passages 60, 62 in such a way as to sealingly engage the faces 24, 26 of flanges 14, 16 respectively, during the fitting of the extensible tubular member 18. In the same way, O-rings 70, 72 are placed in grooves formed in tubular parts 28, 30 around passages 60, 62 so as to engage the opposite faces 74, 76 of wedge 32. As shown in FIGS. 2 and 3, joints 70, 72 are preferably displaced with respect to the axis of the pipes so as not to be damaged by wedge 32 during the movement of the latter.

As shown in FIG. 2, spacers 78 are arranged between flanges 14, 16 so as to ensure a correct parallelism between faces 24, 26 of the latter, making it possible to obtain a good sealing of the device. Moreover, and as is particularly shown in FIG. 3, other spacers 79 define between the opposite faces 24, 26 of flanges 14, 16 guidance means making it possible to receive and position the extensible tubular member 18 with respect to the flanges, which ensures a correct centering of the said member, even when fitting takes place in blind manner in an inaccessible location.

Chamfers 80, (See FIG. 1) 82, 84, 86 are preferably respectively formed on flanges 14 and 16 and on tubular parts 28 and 30, in order to facilitate the insertion of extensible tubular member 18 between the flanges.

According to the invention and as shown in FIG. 1, a random known valve 88 is inserted between two elements 90, 92 constituting the tubular part 28. Elements 90, 92 are connected by means of spacers 94 by means of which the valves 88 is sealingly gripped by means of annular gaskets (not shown).

Moreover, in the embodiment shown in FIG. 1, the ends 10 and 12 of the pipes are positioned behind a tightly sealed wall 96. Such a construction is for example encountered when the nature of the fluid circulating in the pipes and/or the environment in which the pipes are located make it necessary to protect users by means of an enclosure, a partition or a floor having tight sealing characteristics. In this case, the device according to the invention also incorporates a support plate 98 fixed by means of screws 100 or analagous members to a plug 102, whose stepped periphery cooperates in a sealing manner with an opening 104 formed in partition 96. As shown in FIG. 1, screws 100 permit a certain displacement of plate 98 with respect to plug 102 parallel to the axis of threaded bolt 38 and the support plate 98 is associated with the yoke-like supporting member 48 of the extensible tubular member 18.

In order to compensate any displacement which may occur as a result of the construction between opening 104 formed in the partition and ends 10 and 12 of the pipes, without causing stresses in the installation, plug 102 has an opening 106 concentric with respect to opening 104 and which receives a second plug 108 with itself perforated by a hole 110 which is offset with respect to the opening. Hole 110 receives a third plug 112 in which there is also a hole 114 offset with respect to hole 110. A control member 116, which is shown by dot-dash lines in FIG. 1, traverses the eccentric hole 114 by means of a sealing sleeve 118 permitting both the rotation and translation of control member 116 relative to plug 112. Control member 116 is fitted to the operating head 54 of threaded bolt 38 and has at its end positioned externally of partition 96 an operating head 120 by which it can be rotated either directly, if this is permitted by the shape of head 120, or via an appropriate, not shown control tool able to cooperate with its head 120 in the exemplified embodiment shown in FIG. 1.

The construction described hereinbefore makes it possible to remotely control wedge 32 via partition 96, as well as the easy disassembly of the complete device according to the invention, despite the fact that it is positioned behind the tightly sealed partition 96. Thus, the extensible tubular member 18 and valve 88 mounted in said member are associated with plug 102 by supporting plate 98 and supporting member 48 and the dimensions of the opening 104 permit the passage of the extensible member 18 and valve 88 after the refitting of wedge 32 (FIG. 1) by means of control member 116.

Moreover, this construction has the advantage of permitting a compensation of the relatively large displacements usually resulting from the actual construction process between the ends of the pipes and the opening formed in the wall. Thus, the combination of two-plugs 108, 112, each having an eccentric hole 110, 114 makes it possible, by rotating each of the two plugs, to move the axis of hole 114 traverseing the control member 116 within a circular surface which can determined by construction as a function of the position of the eccentric holes 110, 114 and the diameter of the plugs. As illustrated in FIG. 1, it is also possible to use this construction for controlling by means of a single control member 116 both the threaded bolt 38 controlling the displacement of wedge 32 and the operating head 112 of valve 88. To this end, operating head 122 is identical to the operating head 54 of threaded bolt 38 and an opening 126 is made in part 124 of support plate 98 by which the latter is fixed to plug 102 in order to permit the control member 116 to align itself with one or other of the operating heads 54, 122 without any need for disassembly. It is thus possible to prevent any untimely operation of the extensible tubular member 18, which could have the consequence of a fluid leak circulating in the pipes by positioning the operating member 116 opposite the operating head 122 of valve 88 as soon as the extensible tubular member 18 is fitted. This also makes it possible to manipulate wedge 32 for retightening the device in the case of a leak, without it being necessary to interrupt the circulation of the fluid in the pipes or to break the tight sealing of the partition 96.

The connecting device shown in FIGS. 1 to 3 can be assembled and disassembled in the following manner. Flanges 14 and 16 are permanently fixed to ends 10 and 12 to the pipes by means of welds 20 and 22. Spacers 78 are also permanently fitted in order to ensure a correct parallelism of faces 24, 26 of the flanges and a relatively precise alignment of the passages 56, 58 formed in the flanges. However, it should be noted that the fitting of the spacers 78 does not serve to precisely define the distance separating faces 24, 26 at a given value in such a way that the stresses exerted on the spacers 78 remain relatively limited. Finally, the spacers 79 are also permanently fitted so as to define with flanges 14, 16 a cradle ensuring the positioning of the extensible tubular member 18.

Prior to the fitting of the extensible tubular member 18 between flanges 14 and 16, the threaded bolt 38 is rotated by its operating head 54 in the direction corresponding to the upward displacement of wedge 32, with reference to FIG. 2, up to the position illustrated by dot-dash lines in FIG. 2. In this position, as a result of the cooperation of faces 74, 76 with inclined ramps 34, 36, the distance separating the opposite faces of tubular members 28, 30 is at a minimum. The assembly constituted by plugs 102, 108 112, control member 116 received in sealing sleeve 118, support plate 98 carried by plug 102 and the extensible tubular member 18 incorporating valve 88 is then introduced through the opening 104, after the wedge 38 has been refitted in accordance with FIG. 1 so as to reduce the length of the extensible tubular member 18. This is facilitated by chamfers 80, 82, 84, 86, respectively formed on flanges 14, 16 and on tubular parts 28, 30. The positioning of the extensible tubular member 18 is then easily carried out by means of guidance spacers 79 arranged between the flanges in such a way that passages 56, 60, 62 and 58 are automatically aligned. As a result of the displacement between plug 102 and plate 98 permitted by screws 100 parallel to the axis of control member 116, a possible variation between the theoretical and true values of the distance separating the pipes 110 from partition 96 can be compensated. After fitting extensible member 18 the plugs 108 and 112 are rotated until the axis of hole 114 is aligned with that of the threaded bolt 38 controlling the extension of extensible member 18. Control member 116 is then fitted onto the operating head 54 and it is rotated by its head 120 in the direction corresponding to the downward movement of wedge 32 between tubular parts 28 and 30 until the tubular element 90 sealingly engages with the surface 24 and until the tubular part 30 sealingly engages with surface 26. Preferably, the control member 116 is then disengaged from the operating head 54 and the plugs 108, 112 are then again rotated until the axis of the control member 116 is aligned with the operating head 122 of valve 88. Plugs 108 and 112 can be rigidly maintained in this position by any appropriate means, such as for example screws or pins (not shown). The operating head 116 is then fitted onto the operating head 122 of valve 88 and the opening and closing of the latter can be carried out at any time by manipulating the head 120 of the control member. The device according to the invention is disassembled in the reverse order to the operations referred to hereinbefore.

The device described hereinbefore permits a connection of the pipes without subjecting the latter to two significant stresses or strains, because the force exerted by the extensible member 18 on the pipes is independent of the distance separating the facing surfaces 24 and 26 formed on the flanges 14, 16. Moreover, the assembly and disassembly of the extensible tubular member 18 can be carried out in a particularly simple manner, even when the connecting device is located in a substantially inaccessible location. Thus, the extensible tubular member 18 is fitted and removed by means of an operating tool, whose axis is transversely located with respect to the axis of the pipes. Thus, these operations can be carried out through an opening made in a wall or an enclosure, as illustrated in FIG. 1.

The invention is not limited to the embodiments described hereinbefore and in particular the extensible tubular member can be controlled by spacing members differing from wedge 32. These spacing members can comprise, for example, mechanical means such as a rotary cam system, but can also comprise a hydraulic or pneumatic system, such as for example a cylinder-piston system or any other system known to the Expert.

As can be gathered from the preceding description, the device according to the invention makes it possible to arrange a random known valve between two pipes. However, it is readily apparent that this device can also be used for carrying out the fitting of any other apparatus, such as for example a measuring or control apparatus. Finally, two plugs fitted into one another and having one eccentric hole can be provided both facing the threaded bolt controlling the displacement of the wedge and the operating head of the valve in a third plug permitting the assembly and disassembly of the extensible member through the opening formed in the partition. It is then necessary to provide two separate control members for the wedge and for the valve.

What is claimed is:

1. A disassemblable device provided for inserting an apparatus of the valve type between the opposite ends of two pipes defining a common axis, comprising two flanges adapted to be sealingly fixed to the said pipe ends, said device also comprises an axially extensible member constituting a unitary assembly for carrying said apparatus, said extensible member being normally extended and expanded between the flanges along the axis of the pipes so as to sealingly bear against at least one of the flanges and said apparatus to provide a communication between said pipes through a passage extending through said extensible member substantially along the axis of the pipes, said extensible member being adapted to be retracted from its expanded condition between the flanges along the axis of the pipes to allow dismounting of the apparatus carried by said unitary assembly said extensible member and said apparatus being in abutting side-by-side relationship between the flanges along the axis of the pipes.

2. A device according to claim 1, wherein the axially extensible member comprises a first, axially movable, tubular portion carrying the said apparatus, a second axially movable tubular portion, a wedge moving in a transverse direction with respect to the axis of the pipes under the action of control means and cooperating with a ramp made on at least one of the said tubular portions to move the latter along the axis of the pipe on actuation of said control means and a connecting member carrying the wedge by means of said control means and carrying the tubular portions by means of supporting means allowing a displacement of the said tubular portions parallel to the axis of the pipes.

3. A device according to claim 2, wherein the control means are constituted by a threaded bolt screwed into the connecting member and whereof one end is associated in translation with the wedge.

4. A device according to claim 2, wherein annular gaskets are arranged at the ends of the tubular parts able to cooperate with the flanges and between the wedge and the tubular parts.

5. A device according to claim 2, wherein the apparatus is sealingly mounted between two elements, constituting the tubular part by means of spacers connecting the said elements.

6. A device according to claim 1, wherein the spacers connect the flanges in a rigid manner.

7. A device according to claim 1, wherein guidance means are arranged between the flanges for defining with the latter a cradle which receives the extensible member.

8. A disassemblable device provided for inserting an apparatus between the opposite ends of two pipes defining a common axis, comprising two flanges adapted to be sealingly fixed to the said ends, wherein said device also comprises an axially extensible member constituting a unitary assembly carrying said apparatus, said extensible member being normally extended between the flanges along the axis of the pipes so as to sealingly bear against the flanges and provide a communication between said pipes through a passage extending through said extensible member substantially along the axis of the pipes, said extensible member being adapted to be retracted along the axis of the pipes to allow dismounting and mounting of the apparatus carried by said unitary assembly, the axially extensible member including a first, axially movable, tubular portion carrying the said apparatus, a second axially movable tubular portion, a wedge moving in a transverse direction with respect to the axis of the pipes under the action of control means and cooperating with a ramp made on at least one of the said tubular portions to move the latter along the axis of the pipe on actuation of said control means and a connecting member carrying the wedge by means of said control means and carrying the tubular portions by means of supporting means allowing a displacement of the said tubular portions parallel to the axis of the pipes, said control means including a threaded bolt screwed into the connecting member, one end of the bolt being associated in translation with the wedge, the other end of the threaded bolt having an operating head to which is fitted a control member traversing an opening formed in a wall by at least two plugs, the first of said plugs being received in rotary manner in the said opening, whilst the second plug is received in rotary manner in an eccentric hole formed in the first plug and the control member is received in rotary manner in an eccentric hole formed in the second plug.

9. A device according to claim 8, wherein the opening is formed in a third plug, to which is fixed the connecting member, the dimensions of the opening being sufficient to permit the passage of the extensible member.

10. A device according to claim 8, wherein the apparatus is constituted by a valve having an operating head onto which is fitted the operating member, after rotation of the first and second plugs.

* * * * *